(12) United States Patent
Ngo

(10) Patent No.: US 6,226,137 B1
(45) Date of Patent: May 1, 2001

(54) VOLTAGE BIAS, CURRENT SENSE PREAMPLIFIER USING NO AC-COUPLING CAPACITORS FOR A DUAL STRIP MAGNETORESISTIVE READER

(75) Inventor: Tuan V. Ngo, Eden Prairie, MN (US)

(73) Assignee: Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/285,396

(22) Filed: Apr. 2, 1999

Related U.S. Application Data

(60) Provisional application No. 60/080,871, filed on Apr. 6, 1998.

(51) Int. Cl.[7] .................................. G11B 5/09; G11B 5/02
(52) U.S. Cl. .................................................. 360/46; 360/67
(58) Field of Search .................................. 360/46, 66, 67, 360/315

(56) References Cited

U.S. PATENT DOCUMENTS 5,323,278 * 6/1994 Contreras et al. ...................... 360/67
5,978,164 * 11/1999 Shibasaki et al. ...................... 360/67
6,111,716 * 8/2000 Ngo et al. .............................. 360/67

* cited by examiner

Primary Examiner—W. Chris Kim
(74) Attorney, Agent, or Firm—Kinney & Lange, P.A.

(57) ABSTRACT

A read system for receiving information from a storage medium and for supplying a signal to circuitry external to the read system is disclosed. The read system includes a bias current generator, individual channel circuitry, and preamplifier circuitry. The individual channel circuitry further includes a first and a second magnetoresistive element. A plurality of transistors are connected to the first and the second magnetoresistive element and are cross-coupled to each other to cancel out any noise arising from a mismatch of the first and the second magnetoresistive element. The preamplifier circuitry further includes a first gain stage and a second gain stage separated by a first and a second capacitor. The first and the second capacitors permit an AC signal from the first gain stage to the second gain stage, while blocking unwanted DC signals which are necessary to properly bias the first and the second MR element.

12 Claims, 4 Drawing Sheets

VOLTAGE BIAS, CURRENT SENSE PREAMPLIFIER USING NO AC-COUPLING CAPACITORS FOR A DUAL STRIP MAGNETORESISTIVE READER

CROSS-REFERENCE TO RELATED APPLICATION(S)

The present application is based upon and claims priority from U.S. Provisional Application No. 60/080,871 entitled, "Voltage Bias, Current Sense Preamplifier Using No AC-Coupled Caps For Dual Strip MR Head", filed on Apr. 6, 1998.

This application also cross-references U.S. Patent Applications entitled, "Current Bias, Current Sense Preamplifier For A Magnetoresistive Reader" and "Voltage Bias, Current Sense Preamplifier For A Magnetoresistive Reader", both applications filed on even date herewith and assigned to the assignee of the present application.

BACKGROUND OF THE INVENTION

The present invention is a read system for reading information from a storage medium and for providing an output signal to circuitry external from the read system. More particularly, the present invention is a current bias, voltage sense preamplifier using no AC-coupling capacitors for use with a dual stripe magnetoresistive reader.

There are presently two types of disc drive systems which write information to and read information from a magnetic storage medium, such as a disc. First, there is an inductive write, inductive read system. Second, there is an inductive write, magnetoresistive (MR) read system. It is the second category in which the present invention lies.

The front end of a disc drive system typically consists of one or more read/write transducers (recording heads), an electronics module (containing the read preamplifier and the write driver), and interconnections between the various heads and the module. The module is placed close to the head to keep the interconnections as short as possible.

The present trend in the data storage industry is to increase aerial density on a magnetic storage medium at constant or even decreasing latencies. This results in magnetic storage mediums having narrower tracks, larger linear densities and higher data rates. While a single-element inductive read/write head has the attraction of simplicity, its applications are becoming outdated due to a nonadequate bandwidth. The bandwidth of a head directly affects the speed with which a head can read information from a magnetic storage medium. The larger the upper pole of the bandwidth, i.e., the point at which the gain of the head begins to roll off, the faster the head can read information from the magnetic storage medium.

In traditional inductive read/write heads, there is a severe conflict in choosing the ideal number of coil "turns" for read and write operations. Narrower track widths require a larger number of turns for reading. This makes the coil inductance increase quadratically. The resonance frequency of the coil inductance and the coil/wiring/electronics capacitance therefore decreases linearly. This reduces the useful data bandwidth rather than increasing it to accommodate a higher data rate. The use of a MR read element does not present this bandwidth restriction. It also allows separate optimization of the MR read element and the inductive write element, making possible write-wide, read-narrow strategies.

A preamplifier that senses a signal out from a MR read element is fundamentally different than a preamplifier which senses a signal from an inductive read sensor. The inductive read sensor has no DC bias across it so that a preamplifier can be directly coupled to it to sense the signal from DC frequencies up to the required upper bandwidth. An MR preamplifier, however, must have the ability to compensate for an inherent DC offset across the sensor which is required to properly bias the MR read element, thereby producing a linear output signal. This bias is on the order of a few hundred milli-volts so that a high gain amplifier that amplifies DC signals cannot be directly connected to the sensor. If such a connection were made, the preamplifier would sense this offset and saturate the amplifier. Therefore, a preamplifier which is connected to an MR read element should pass an AC signal representing information from the magnetic storage medium, but not past the DC biasing signal used to bias the MR read element.

In conjunction with a single strip MR read element, the MR read element, a preamplifier, and a bias current generator are formed in a series arrangement between two supply terminals. Thus, the current supplied by the bias current generator is fed to the MR element so as to bias the MR element. The current supplied to the bias current generator is also fed to the preamplifier circuit. This bias current through the preamplifier circuit results in a certain noise contribution. Prior art preamplifier circuits utilize a capacitor connected between a low voltage potential terminal and a gate of a MOSFET or jFET transistor within the individual channel circuit. Thus, the unwanted DC signal is eliminated during a read operation. However, the MOSFET or jFET transistor of the preamplifier circuit provides a substantially high level of unwanted noise into the system and prevents accurate reading of the desired signal.

In conjunction with a dual strip magnetoresistive head, which includes two separate magnetoresistive elements, prior art preamplifier circuits utilize a cross-coupling design which cross-couples two capacitors between two separate MOSFET or jFET transistors within the individual channel circuit. Each MOSFET or jFET transistor corresponds to one of the MR elements similar to the single strip MR design. Once again, the two MOSFET or jFET transistors provide a substantially high level of unwanted noise to the system which prevents accurate reading of the desired signal. In addition, multiple capacitors per individual channels were necessary.

Therefore, there is a need for a preamplifier circuit which will block any unwanted DC signals during a read operation and will minimize the amount of unwanted noise within the preamplifier circuitry using a minimal amount of components.

BRIEF SUMMARY OF THE INVENTION

A read system for receiving information from a storage medium and for supplying a signal to circuitry external to the read system is disclosed. The read system includes a bias current generator, individual channel circuitry, and preamplifier circuitry. The individual channel circuitry further includes a first and a second magnetoresistive element. A plurality of transistors are connected to a first and a second magnetoresistive element and are cross-coupled to cancel out any noise arising from a mismatch of a first and a second magnetoresistive element. The preamplifier circuitry further includes a first gain stage and a second gain stage separated by a first and a second capacitor. The first and the second capacitors permits an AC signal from the first gain stage to the second gain stage, while blocking unwanted DC signals which are necessary to properly bias the first and the second MR element.

DETAILED DESCRIPTION

The present invention is a current bias, current sense preamplifier for use with one or more magnetoresistive (MR) read heads. The present invention provides a preamplifier which minimizes a DC signal during a read operation and minimizes the amount of unwanted noise within the preamplifier circuitry caused by MOSFET or jFET transistors in prior art designs. The DC signal is initially necessary to properly bias the MR reader such that it will read information from the magnetic storage medium. The present invention can be used in conjunction with a single or a dual strip MR head, and can be used with a single head or a plurality of heads.

Figure 1A:
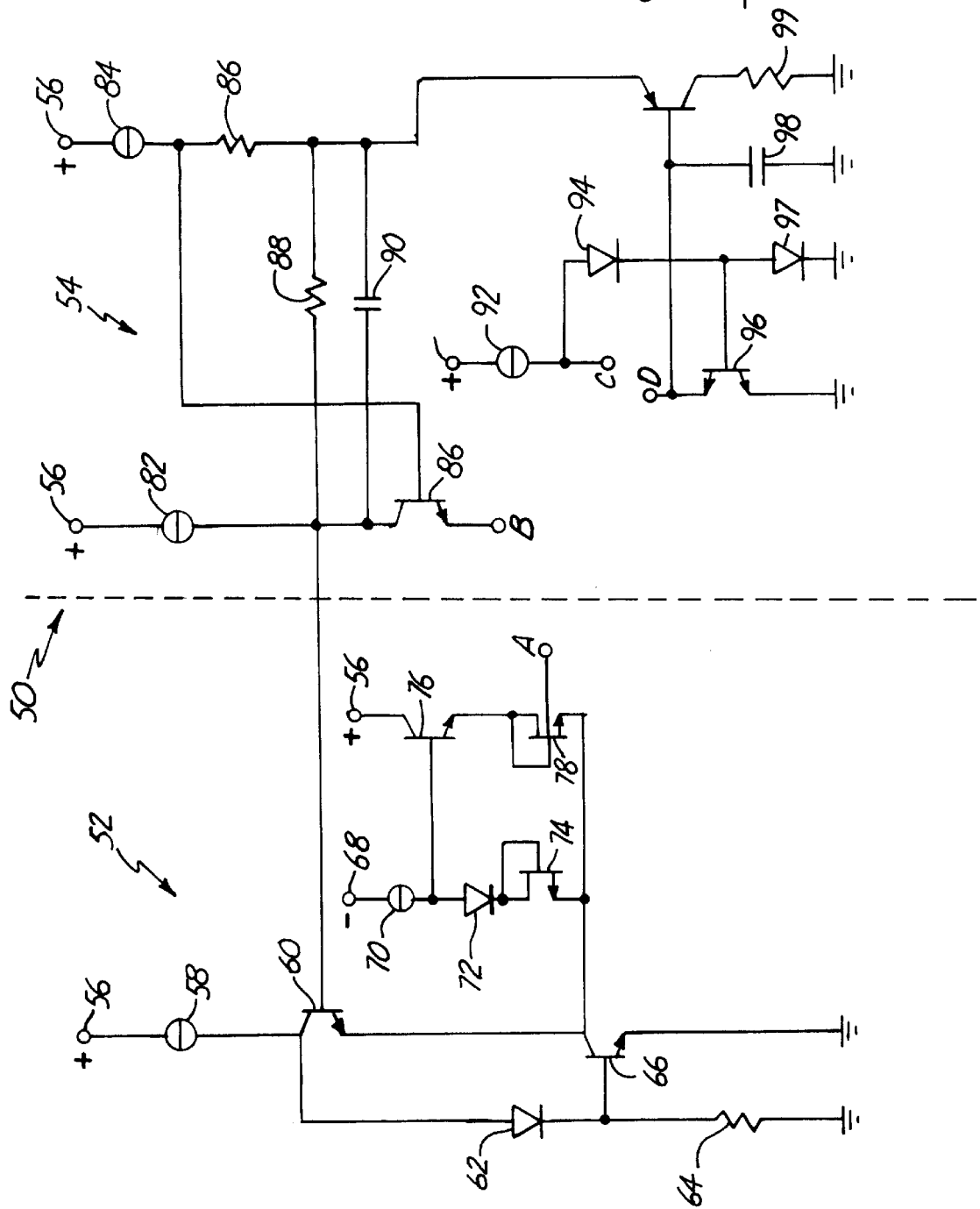
FIG. 1A is a prior art circuit diagram showing a prior art preamplifier circuit.
Figure 1B:
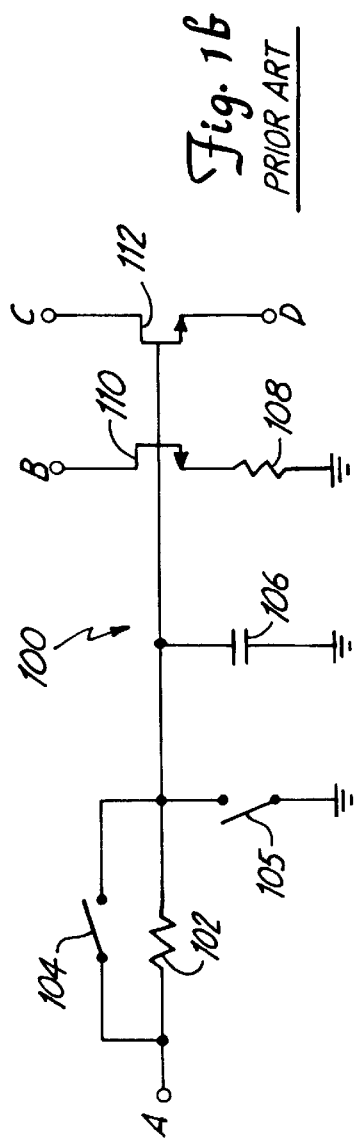
FIG. 1B is a prior art circuit diagram showing an individual channel circuit with use for a single strip magnetoresistive element.

FIGS. 1A and 1B are circuit diagrams showing a prior art preamplifier circuit and a prior art individual channel circuit for use with a single strip MR head, respectively. FIGS. 1A and 1B can be coupled together in order to realize the multiplexed read out of information from a storage system. FIG. 1A shows prior art circuitry 50 which is common to all MR heads and FIG. 1B shows prior art circuitry 100 which is for an individual channel. While circuitry 100 is for an individual channel, multiple channels can be utilized by copying circuitry 100 as necessary.

Prior art circuitry 50 is divided into two portions, feedback circuit 52 and preamplifier circuit 54. Feedback circuit 52 includes consist potential 56, current source 58, bi-polar junction transistor 60, diode 62, resistor 64, bi-polar junction transistor 66, consist potential 68, current source 70, diode 72, MOS transistor 74, bi-polar junction transistor 76, and MOS transistor 78.

Preamplifier circuit 54 includes consist potential 56, current source 80, current source 82, bi-polar junction transistor 84, resistors 86 and 88, capacitor 90, current source 92, diode 94, bi-polar junction transistor 96, diode 97, capacitor 98, and resistor 99. Also shown in FIG. 1A are terminals A, B, C, and D. These terminals are the interconnection points between prior art circuitry 50 of FIG. 1A and prior art circuitry 100 of FIG. 1B.

Prior art FIG. 1B shows prior art circuitry 100 which includes terminals A, B, C, and D, MR resistor 102, switches 104 and 105, DC blocking capacitor 106, resistor 108, and MOS transistors 110 and 112.

While the prior art design shown in FIGS. 1A and 1B provided proper feedback and preamplifier circuitry, the use of MOS transistors 110 and 112 within individual channel circuitry 100 provide an unacceptable amount of noise which interferes with the reading of information from the magnetic storage medium by MR resistor 102 during a read operation.

Figure 1C:
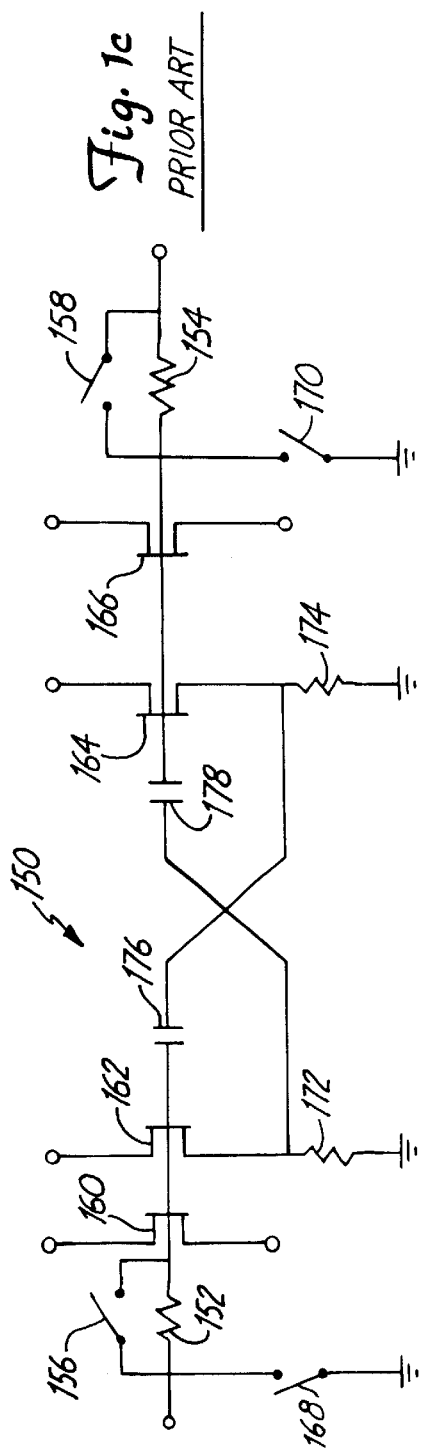
FIG. 1C is a prior art circuit diagram showing an individual channel circuit for use with a dual strip magnetoresistive element.

FIG. 1C is a prior art circuit diagram showing individual channel circuitry 150 for a balanced or dual version MR head. Circuitry 150 includes MR resistors 152 and 154, switches 156 and 158, MOS transistors 160, 162, 164, and 166, switches 168 and 170, resistors 172 and 174, and DC blocking capacitors 176 and 178.

Circuitry 150 shown in FIG. 1C is virtually identical to circuitry 100 of FIG. 1B, except that circuitry 150 of FIG. 1C includes a second MR resistor and related circuitry. Therefore, the right side of FIG. 1C is the mirror image of the left side of FIG. 1C. One distinction between circuitry 150 of FIG. 1C and circuitry 100 of FIG. 1B is that rather than having DC blocking capacitor 106 of FIG. 1B connected to ground, DC blocking capacitors 176 and 178 of FIG. 1C are crossed coupled between the drain and source of MOS transistors 162 and 164. Similar to circuitry 100 shown in FIG. 1B, circuitry 150 of FIG. 1C suffers from unacceptably high noise due to MOS transistors 160, 162, 164, 166, thereby preventing MR resistors 152 and 154 from properly reading information from a magnetic storage medium during a read operation.

Figure 2:
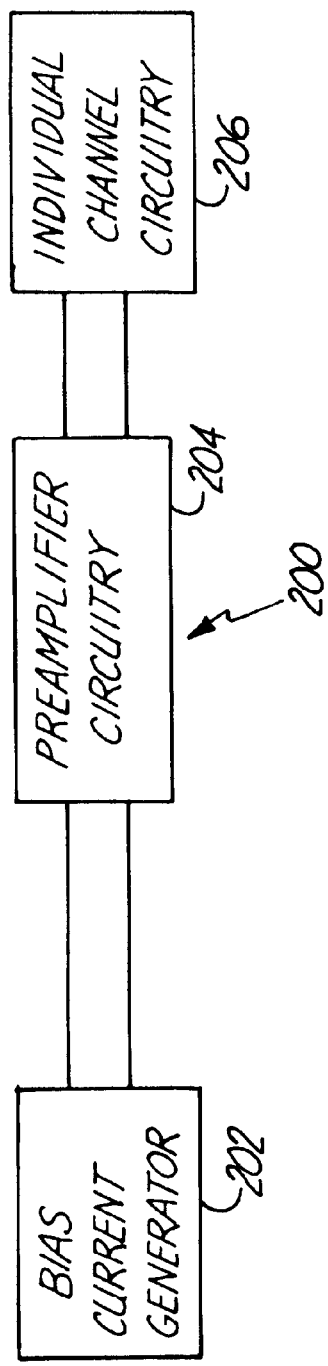
FIG. 2 is a block diagram of a read system of the present invention.

FIG. 2 is a block diagram of a read system of the present invention. As shown in FIG. 2, block diagram 200 includes bias current generator 202, preamplifier circuitry 204, and individual channel circuitry 206. The present invention lies within preamplifier 204 and individual channel circuitry 206 and utilizes at least one operational amplifier in a novel arrangement with at least one capacitor. This novel arrangement permits proper biasing of an MR head within individual channel circuitry 206 through use of a DC signal, while minimizing both the DC signal and unwanted noise during a read operation.

Figure 3:
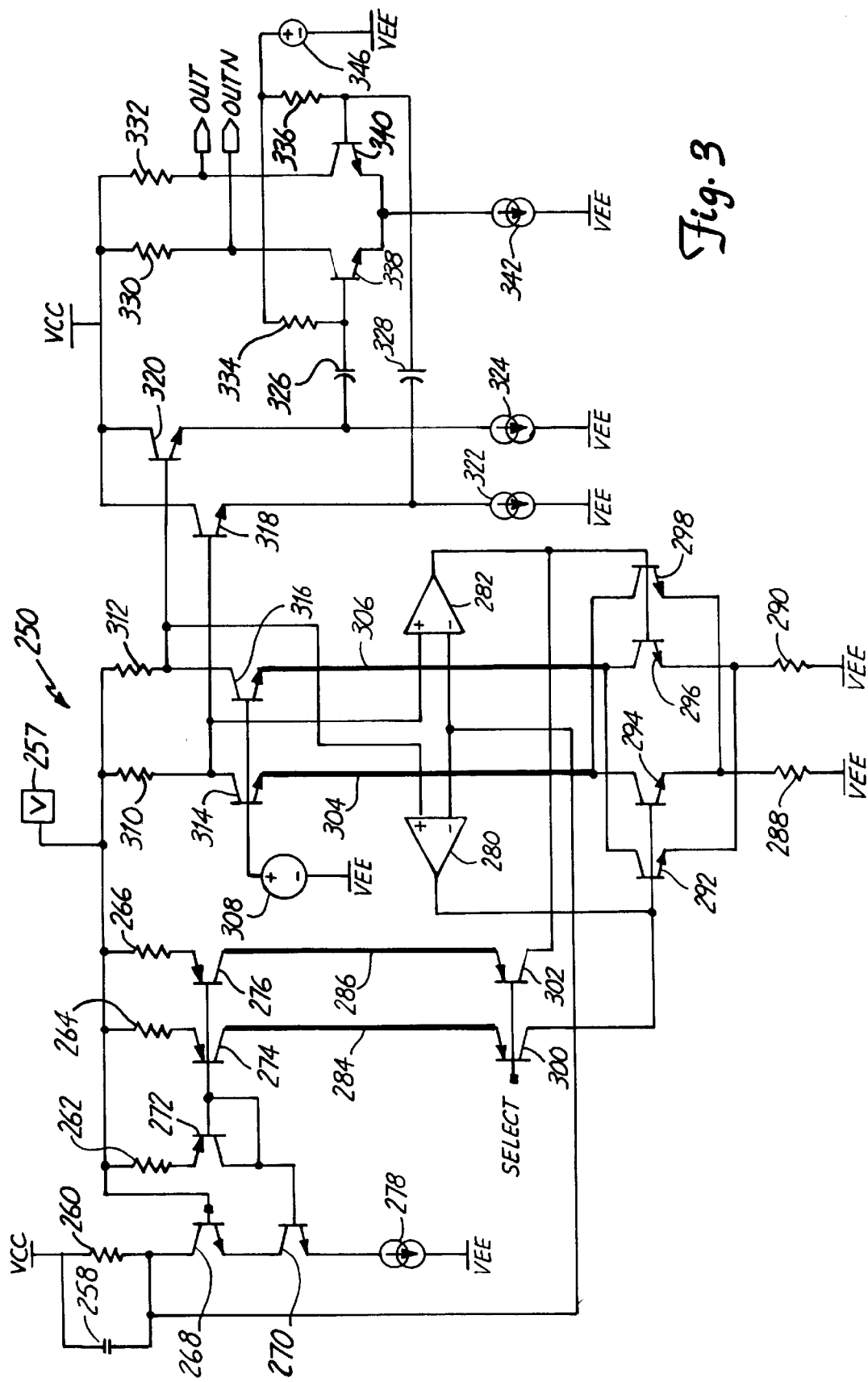
FIG. 3 is a circuit diagram showing the present invention for use with a dual strip magnetoresistive element.

FIG. 3 is a circuit diagram shown in the present invention for use with a dual strip MR element. Read system 250 includes bias current generator 252, head cell circuitry 254, preamplifier circuitry 256, and voltage regulator 257.

Voltage regulator 257 regulates the voltage within bias current generator 252 and preamplifier 256. Bias current generator 252 is a bias current generator system which will properly bias the head cell circuitry. However, it is understood that other designs for bias current generator 252 may be utilized in conjunction with the present invention. Bias current generator 252 includes first potential $V_{CC}$, second potential $V_{EE}$, capacitor 258, resistors 260, 262, 264, and 266, transistors 268, 270, 272, 274, and 276, current source 278 and operational amplifiers 280 and 282. Transistors 268 and 272 are NPN bipolar junction transistors (BJT), while transistors 272, 274, and 276 are PNP BJTs.

Capacitor 258 and resistor 260 are connected in parallel between voltage potential $V_{CC}$ and the collector of transistor 268. The emitter of transistor 268 is connected to the capacitor of transistor 270, while the base of transistor 268 is connected to preamplifier circuitry 256. Current source 278 is connected between the emitter of transistor 270 and voltage potential $V_{EE}$. Resistors 262, 264, and 266 are connected between preamplifier circuitry 256 and the emitters of transistors 272, 274, and 276, respectively. The collector of transistor 272 is connected to the base of both transistors 270 and 272. The base of 272 is also connected to the base of transistor 274 and the base of transistor 276. The collector of transistors 274 and 276 are connected to head cell circuitry 254 via bus lines 284 and 286.

In one preferred embodiment, in order to properly design the circuit of the present of the present invention, capacitor 258 has a value in the range of 50 to 300 picoFarrads, while resistor 260 has a value in the range of 1 to 5 kilo Ohms. Resistor 262 has a value in the range of 10 to 30 kilo Ohms, while resistors 264 and 266 each have a value in the range of 5 to 20 kilo Ohms. Current source 278 has a value in the range of 2 to 10 microAmperes.

Head cell circuitry 254 further includes MR resistors 288 and 290 and transistors 292, 294, 296, 298, 300, and 302. MR resistors 288 and 290 are connected between the emitters of transistors 292, 294, 296, and 298 and voltage potential $V_{EE}$. All transistors within head cell circuitry 254 are PNP BJTs. The bases of transistors 300 and 302 are connected to each other, while the emitters of transistors 300 and 302 are connected to bias current generator 252 via bus lines 284 and 286, respectively. Transistors 300 and 302 are used for channel selection. While FIG. 3 shows a single head circuitry, several head circuits can be connected to bias current generator 252 and preamplifier circuitry 256 via bus lines 284, 286, 304, and 306. Thus, bias current generator 252 and preamplifier circuitry 256 can be connected to numerous head cell circuits. Transistors 300 and 302 dictate whether the particular head cell circuit shown in FIG. 3 is receiving a power supply from the read system and transmitting a read signal to preamplifier circuitry 256. In one preferred embodiment, transistors 300 and 302 are replaced by switches.

Transistors 292 and 298 are cross-coupled devices with their bases being cross-coupled. The cross-coupled of the bases cancels out the noise arriving from any mismatch of the value of MR resistors 288 and 290. In one preferred embodiment, in order to properly design the circuitry of the present invention, MR resistors 288 and 290 should have a value in the range of 5 to 100 Ohms.

Preamplifier circuitry 256 utilizes two separate gain stages in order to provide a proper signal to external circuitries. The first stage includes voltage source 308, resistors 310 and 312, transistors 314, 316, 318, and 320, and current sources 322 and 324. The second gain stage of preamplifier circuitry 256 includes capacitors 326 and 328, resistors 330, 332, 334, and 336, transistors 338 and 340, current source 342 and voltage source 346.

As shown in FIG. 3, transistors 314, 316, 318, 320, 338, and 340 are all NPN BJTs. Voltage source 308 is connected between voltage potential $V_{EE}$ and the base of transistor 314. The base of transistor 314 is also connected to the base of transistor 316. Resistors 310 and 312 are connected between bias current generator 252 and the collector of transistors 314 and 316, respectively. The emitters of transistors 314 and 316 are connected to head cell circuitry 254 via bus lines 304 and 306, respectively.

The base of transistor 318 is connected between resistor 310 and the collector of transistor 314, while the base of transistor 320 is connected between resistor 312 and the collector of transistor 316. The collectors of transistors are connected to voltage potential $V_{CC}$, while the emitters of transistors 318 and 320 are connected to current sources 322 and 324, respectively. Capacitor 326 is a DC blocking capacitor which is connected between the emitter of transistor 320 and the base of transistor 338, while capacitor 328 is a DC blocking capacitor which is connected between the emitter of transistor 318 and the base of transistor 340. The emitters of transistors 338 and 340 are interconnected and are also connected to current source 342. Resistors 330 and 332 are connected between voltage potential $V_{CC}$ and the collector of transistors 338 and 340, respectively. Resistors 304 and 306 are interconnected between the bases of transistors 338 and 340 and voltage source 346, respectively. Current source 342 is connected to voltage potential $V_{EE}$.

Within the first gain stage of preamplifier circuitry 256, transistors 314 and 316 are cascode devices. The emitters of transistors 314 and 316 are the input points for all other individual head channels. Resistors 310 and 312 are the gain load resistors. The first stage gain is determined by dividing the value of resistor 310 by the value of resistor 288 or by dividing the value of resistor 312 by the value of resistor 290. Transistors 318 and 320 and current sources 322 and 324 are level shifters and upper buffers which conclude the first stage gain.

The offset voltage of the first stage gain is eliminated by using two small capacitors 326 and 328 to AC-couple to the inputs of the second gain stage. The second gain stage consists of differential transistor pair 338 and 340, load resistors 330 and 332, and tail current 342.

In one preferred embodiment, in order to properly design the circuitry of the present invention, capacitors 326 and 328 each have a value in the range of 10 to 250 picoFarrads. Resistors 310 and 312 should each have a value in the range of 100 to 750 Ohms, while current source 322 and 324 should each have a value in the range of 0.25 to 3.0 milliAmperes. Voltage sources 308 and 346 should each have a value in the range of 0.5 to 5.0 volts. Resistors 330 and 332 should each have a value in the range of 250 to 3000 Ohms, while resistors 334 and 336 should each have a value in the range of 5.0 to 20.0 kilo Ohms. Current source 342 should have a value in the range of 1.0 to 5.0 milliAmperes.

The two stage design of the preamplifier system of the present invention in combination with the cross-coupling design of the head circuitry provides proper amplification of a read signal received from head cell circuitry 254, while eliminating an unwanted DC signal. The DC signal is initially necessary to properly bias MR resistors 288 and 290. With the present design, a voltage-bias, current-sense preamplifier provides a simple design having small DC coupling capacitors 326 and 328 which in turn provide fast transition time. In addition, the present invention provides low-noise, a high supply rejection, and a high common mode rejection.

Although the present invention has been described with reference to preferred embodiments, workers skilled in the art will recognize that changes may be made in form and detail without departing from the spirit and scope of the invention.

What is claimed is:

1. A read system for receiving information from a storage medium and for supplying a signal to circuitry external to the read system, the read system comprising:

individual channel circuitry comprising:
a first and a second magnetoresistive element, each magnetoresistive element having a first terminal connected to a first potential;
a first and a second transistor, each transistor having a base, a collector, and an emitter, the emitter of the first transistor connected to a second terminal of the first magnetoresistive element, and the emitter of the second transistor connected to a second terminal of the second magnetoresistive element;
a third and a fourth transistor, each transistor having a base, a collector, and an emitter, the emitter of the third transistor connected to the second terminal of the second magnetoresistive element, and the emitter of the fourth transistor connected to the second terminal of the first magnetoresistive element, the base of the third transistor connected to the base of the first transistor, and the base of the second transistor connected to the base of the fourth transistor;
a first switch connected to the base of the first and third transistors; and a second switch connected to the base of the second and fourth transistors;

a bias current generator connected to a second potential and to the individual channel circuitry for providing a bias current to the read system; and preamplifier circuitry connected to the bias current generator and the individual channel circuitry, the preamplifier circuitry further comprising:

a first gain stage further comprising:

a first and a second resistor connected to the bias current generator;

a first voltage source connected to the second potential;

a fifth and a sixth transistor having a base, a collector, and an emitter, the bases of the fifth and sixth transistors connected to each other and connected to the first voltage source, the emitters of the fifth and sixth transistors connected to the collectors of the first and second transistors, respectively;

a seventh transistor having a base, a collector, and an emitter, the base connected between the first resistor and the collector of the fifth transistor;

an eighth transistor having a base, a collector, and an emitter, the base connected between the second resistor and the collector of the sixth transistor, the collector of the eighth transistor connected to the first potential;

a first current source connected between the emitter of the seventh transistor and the first potential; and a second current source connected between the emitter of the eighth transistor and the first potential;

a second gain stage further comprising:

a third resistor connected to the second potential;

a fourth resistor connected to the second potential;

a ninth transistor having a base, a collector, and an emitter, the collector connected to the third resistor;

a tenth transistor having a base, a collector, and an emitter, the collector connected to the fourth resistor, and the emitter connected to the emitter of the ninth transistor;

a third current source connected between the emitters of the ninth and tenth transistors and the first potential;

a fifth resistor connected between the base of the ninth transistor and a first node;

a sixth resistor connected between the base of the tenth transistor and the first node;

a second voltage source connected between the first node and the first potential;

a first capacitor connected between the base of the ninth transistor and a second node positioned between the emitter of the eighth transistor and the second current source; and a second capacitor connected between the base of the tenth transistor and a third node positioned between the emitter of the seventh transistor and the first current source.

2. The read system of claim 1, wherein the first and second magnetoresistive elements each have a value in the range of 5 to 100 Ohms.

3. The read system of claim 1, wherein the first and second resistors each have a value in the range of 100 to 750 Ohms.

4. The read system of claim 1, wherein the first voltage source has a value in the range of 0.5 to 5.0 volts.

5. The read system of claim 1, wherein the first and second current sources each have a value in the range of 0.25 to 3.0 milliAmperes.

6. The read system of claim 1, wherein the third and fourth resistors each have a value in the range of 0.25 to 3.0 kilo Ohms.

7. The read system of claim 1, wherein the third current source has a value in the range of 1.0 to 5.0 milliAmperes.

8. The read system of claim 1, wherein the fifth and sixth resistors each have value the range of 5.0 to 20.0 kilo Ohms.

9. The read system of claim 1, wherein the second voltage source has a value in the range of 0.5 to 5.0 volts.

10. The read system of claim 1, wherein the first and second capacitors each have a value in the range of 10 to 250 picoFarrads.

11. A read system for receiving information from a storage medium and for supplying a signal to circuitry external to the read system, the read system comprising:

a bias current generator connected to a first potential;

individual channel circuitry comprising:

a first and a second magnetoresistive element, each magnetoresistive element having a first terminal connected to a second potential;

a first and a second transistor having a base, a collector, and an emitter, the emitters of the first and second transistors connected to the first and second magnetoresistive elements, respectively and the bases of the first and second transistors connected to the bias current generator;

a third and a fourth transistor having a base, a collector, and an emitter, the base of the third transistor connected to the base of the first transistor, while the base of the fourth transistor is connected to the base of the second transistor, the collector and emitter of the third transistor connected to the collector and the emitter of the second transistor, respectively, and the collector and the emitter of the fourth transistor connected to the collector and emitter of the first transistor, respectively;

a first switch connected between the base of the first and third transistors and the bias current generator; and a second switch connected between the base of the second and fourth transistors and the bias current generator;

preamplifier circuitry connected to the bias current generator and the individual channel circuitry, the preamplifier circuitry further comprising:

a first gain stage connected to a bias current generator and the individual channel circuitry;

a second gain stage connected to an output; and a first and a second capacitor connected between the first gain stage and the second gain stage.

12. The read system of claim 1, wherein the first and the second capacitor each have a value in the range of 10 to 100 picoFarrads.

* * * * *

UNITED STATES PATENT AND TRADEMARK OFFICE
CERTIFICATE OF CORRECTION

PATENT NO. : 6,226,137 B1  
DATED : May 1, 2001  
INVENTOR(S) : Tuan V. Ngo

Page 1 of 1

It is certified that error appears in the above-identified patent and that said Letters Patent is hereby corrected as shown below:

<u>Column 8,</u>  
Line 58, delete "claim 1", insert -- claim 11 --

Signed and Sealed this

Second Day of April, 2002

Attest:

JAMES E. ROGAN  
*Attesting Officer*  *Director of the United States Patent and Trademark Office*